United States Patent
Griesemer et al.

(10) Patent No.: US 6,385,660 B2
(45) Date of Patent: May 7, 2002

(54) SITE SPECIFIC MESSAGE DISPATCH IN OBJECT-ORIENTED SYSTEMS

(75) Inventors: Robert Griesemer, Menlo Park; Urs Hölzle, Goleta, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/944,331

(22) Filed: Oct. 6, 1997

(51) Int. Cl.[7] ................................................. G06F 9/54
(52) U.S. Cl. ...................................................... 709/315
(58) Field of Search ................................ 709/303, 315, 709/318

(56) References Cited

U.S. PATENT DOCUMENTS

| 5,297,284 A | | 3/1994 | Jones et al. |
|---|---|---|---|
| 5,361,350 A | | 11/1994 | Conner et al. |
| 5,442,793 A | | 8/1995 | Christian et al. |
| 5,485,617 A | | 1/1996 | Stutz et al. |
| 5,522,071 A | * | 5/1996 | Guillen et al. .............. 395/650 |
| 5,600,838 A | | 2/1997 | Guillen et al. .............. 395/683 |
| 5,701,485 A | * | 12/1997 | Guillen et al. .............. 395/683 |
| 5,754,862 A | | 5/1998 | Jones et al. |
| 5,771,384 A | | 6/1998 | Remington et al. |
| 5,774,723 A | | 6/1998 | Endicott et al. |
| 5,794,044 A | | 8/1998 | Yellin |
| 5,884,316 A | | 3/1999 | Bernstein et al. |
| 5,907,707 A | | 5/1999 | Ramalingam et al. |
| 5,960,197 A | * | 9/1999 | Segnan ....................... 395/702 |
| 5,987,529 A | * | 11/1999 | Nakamura et al. .......... 709/303 |

FOREIGN PATENT DOCUMENTS

EP 0546684 A2 6/1993

OTHER PUBLICATIONS

Holzle et al., "Reconciling Responsiveness with Performance in Pure Object–Oriented Languages," ACM Transactions on Programming Languages and Systems, vol. 18, No. 4, pp. 355–400, Jul. 1996.*

(List continued on next page.)

Primary Examiner—Zarni Maung
Assistant Examiner—Gary Scott Fourson
(74) Attorney, Agent, or Firm—Beyer Weaver & Thomas, LLP

(57) ABSTRACT

Systems and methods for implementing site specific message dispatch in an object-oriented environment are provided. Receiver type information may be saved at a message dispatch site in order to provide site specific message dispatch. By allowing message dispatch to vary at different call sites, object-oriented systems may be more efficient and flexible.

21 Claims, 11 Drawing Sheets

OTHER PUBLICATIONS

Agesen et al., "Type Feedback vs. Concrete Type Inference: A Comparison of Optimization Techniques for Object–Oriented Languages," OOPSLA–ACM, pp. 91–94, Dec. 1995.*

Grove et al., "Profile–Guided Receiver Class Prediction," OOPSLA–ACM, pp. 108–123, Dec. 1995.*

Cramer et al., "Compiling Java Just in Time," May/Jun. 1997, IEEE Micro, pp. 36–43.

Grove et al., "Profile–Guided Receiver Class Prediction," OOPSLA '95: Conference on Object Oriented Programming Systems Languages and Applications, Oct. 15–19, 1995, Tenth Annual Conference,, vol. 30, No. 10, pp. 108–123.

Hozle et al., "Optimizing Dynamically–Typed Object–Oriented Languages With Polymorphic Inline Caches," Jul. 1991, Proceedings of ECOOP '91, European Conference on Object–Oriented Programming, Geneva, Switzerland.

Hölzle and Ungar, "Optimizing Dynamically–Dispatched Calls with Run–Time Type Feedback,"Jun. 1994, SIGPLAN Conference on Programming Language Design and Implementation, Orlando, FL.

Hölzle and Agesen, "Dynamic vs. Static Optimization Techniques for Object–Oriented Languages", 1996, TAPOS.

Karl Driesen, "Method Lookup Strategies in Dynamically Typed Object–Oriented Programming Languages," 1992–1993, Dissertation submitted in partial fulfillment for the degree of Masters in Computer Science from Vrije Universiteit Brussel.

Driesen et al., "Message Dispatch on Pipelined Processors", 1995, Accepted at ECOOP' 95, to appear in Lecture Notes in Computer Science.

Plevyak et al., "Type Directed Cloning for Object–Oriented Programs", Languages and Compilers for Parallel Computing, $8^{th}$ International Workshop, LCPC 1995 Columbus, Aug. 10–12, 1995, No. Workshop 8, Aug. 10, 1995, pp. 566–580.

* cited by examiner

SITE SPECIFIC MESSAGE DISPATCH IN OBJECT-ORIENTED SYSTEMS

CROSS REFERENCE TO RELATED APPLICATIONS

This application is related to U.S. Patent Application No. 08/944,332, now U.S. Pat. No. 6,317,796 entitled "Inline Database for Receiver Types in Object-Oriented Systems," U.S. patent application Ser. No. 08/944,735, now U.S. Pat. No. 5,970,249 entitled "Method and Apparatus for Performing Byte-Code Optimization During Pauses, U. patent application Ser. No. 08/944,335, now U.S. Pat. No. 6,009,517 entitled "Mixed Execution Stack and Exception Handling," U.S. patent application Ser. No. 08/944,326, entitled "Method and Apparatus for Implementing Multiple Return Sites," U.S. patent application Ser. No. 08/944,334, now U.S. Pat. No. 5,995,754 entitled "Method and Apparatus for Dynamically Optimizing Byte-Coded Programs," U.S. patent application Ser. No. 08/944,330, now U.S. Pat. No. 5,933,635 entitled "Method and Apparatus for Dynamically Optimizing Compiled Activations, " all filed concurrently herewith, U.S. patent application Ser. No. 08/884,856, entitled "Interpreting Functions Utilizing a Hybrid of Virtual and Native Machine Instructions," filed Jun. 30, 1997, and U.S. patent application Ser. No. 08/885,008, now U.S. Pat. No. 6,021,273 entitled "Interpreter Generation and Implementation Utilizing Interpreter States and Register Caching," filed Jun. 30, 1997, which are all incorporated herein by reference for all purposes in their entirety.

BACKGROUND OF THE INVENTION

The present invention relates to message dispatch in object-oriented systems. More specifically, the invention relates to site specific message dispatch techniques for the Java™ virtual machine.

The fundamental idea behind object-oriented languages is the combination of both data and the methods (or functions) that operate on that data into a single unit, which is called an object. An object's functions typically provide the only way to access the data that is encapsulated by the object. The data is accessed by sending a message to the object instructing the object to invoke the method specified by the message.

Efficient message dispatch is of paramount importance in object-oriented languages. This is because message dispatch is a very frequent operation in objectoriented programs and is performed at runtime; therefore, it should be as fast as possible. Message dispatch, however, is far from being a trivial operation. Unlike procedural programming languages (e.g., the C programming language) that can determine a function's address before runtime, object-oriented languages must determine the method that handles a message that has been dispatched to a receiver object at runtime, and it may involve an extensive search.

In order to better understand the complexities of message dispatch, FIG. 1 shows a class hierarchy including methods of each class. A class hierarchy 1 includes at its root a parent class A 3 that defines two virtual functions foo() and bar(). Virtual functions are functions that may be defined in a parent class and redefined in the children classes. Classes B 5 and class C 7 inherit the data and methods of the parent class A. As shown, class B does not redefine either of the virtual functions foo() and bar(). However, class C redefines the virtual function foo. When an object of class C is requested to invoke the method foo, the method invoked will be the method defined by the class C, not the parent class A. Classes D 9 and E 11 also redefine the method foo.

As it is generally impossible to determine the class of an object statically, the search for the correct method is performed at runtime, during message dispatch. There are many known techniques for implementing method dispatch. For example, FIG. 2 shows an inline cache. Assume a method 51 was originally as follows:

```
main()
{
...
x.foo();
...
}
```

Thus, the method main includes a statement x.foo() in order to invoke the method foo of object x.

During runtime, the system would have to determine to which class object x belongs before the method to handle the method could be invoked. With an inline cache, the first time the system determines the class to which object x belongs, a direct call to the class's method is written into the computer code.

Assuming that object x is a member of class A, the call x.foo() is changed to a direct call A::foo(). The arrow specifies a method foo for class A 53. Since the object x may not be of class A every time, a prolog 55 verifies that the object x is of the correct class, which is represented as the expression x=A meaning that it is determined if the class of object x is equal to class A. The class of an object may be determined from a value stored in the object. If the object is of the correct class, a jump is performed to method code 57 that handles the message.

Returning to prolog 55, if the object is not of class A, a method lookup routine is called in order to determine the correct method. Once the correct method is found, the system updates the message dispatch (or call) site with a direct call to that method. Additionally, the system updates the prolog to specify the new class. As an example, assume that the first time that the system encountered x.foo (), object x was of class A and the data structures were modified as shown in FIG. 2.

Once the data structures are modified as shown, subsequent calls to x.foo() will be substantially more efficient if object x is of class A. However, if object x subsequently is of class B, prolog 55 calls a method lookup routine to find the method and let's assume it determines that object x of now is class B. Referring again to FIG. 1, it is seen that the method foo for class B is the same method foo as defined in class A (i.e., class B did not redefine the virtual function foo). Accordingly, the message dispatch in method 51 will be changed to B::foo () and the condition in prolog 55 will be changed to x=B.

An inline cache may be an efficient way of implementing message dispatch if the object at a call site bar remains the same class. However, if the object is of multiple classes, the system is continually calling the method lookup routine and patching the call site and prolog. Thus, the system may be actually less efficient.

Another technique for implementing message dispatch is the use of polymorphic inline cache as shown in FIG. 3. As before, a method 101 originally included a method dispatch x.foo(). With a polymorphic inline cache, a stub 103 is generated that is able to perform the message dispatch for different receiver types. The original message dispatch is overwritten with a call to the polymorphic inline cache stub 103. Each time a new receiver type is encountered, a statement is added to the stub. As shown, three different receiver types of have been encountered thus far. If the receiver type and has been encountered, a call is made to the method to handle the message for that receiver type. Otherwise, the method lookup routine is called to determine the appropriate method to handle the message. Typically, a new statement will be added to stub 103 in order to handle each new receiver type.

The polymorphic inline cache is more flexible than the inline cache as it is able to handle multiple receiver types. However, a drawback of the polymorphic inline cache is that as more receiver types are encountered, the stub continues to grow and it becomes less and less efficient at performing message dispatch. For example, the system may need to plow through multiple if statements before finding the right method to handle the message.

FIG. 4 shows another message dispatch technique called hashing. In hashing, the original message dispatch in a method 151, x.foo(), is overwritten with a call to a hash function 153. The hash function hashes the receiver type and the message in order to form a hash key, which is typically an index into a hash table 155. The hash table includes an index 157, receiver types 159, messages 161, and methods 163. Once the hash function hashes to a row in cash table 155, the receiver type and message are retrieved from columns 159 and 161 of the hash table. If the receiver type and message at the call site match the receiver type and message in the row of the hash table, the method specified in column 163 of hash table 155 is invoked. Otherwise, a method lookup routine is called in order to find the correct method. Typically, the new method is then added to the hash table.

Although hashing is the most flexible message dispatch technique we have described thus far, it is more computationally and storage intensive then the other techniques. Another drawback of the message dispatch techniques we have described is that none of the techniques are site specific. In other words, none of the message dispatch techniques provide the flexibility of handling message dispatches at different call sites in a different manner. Other method dispatch techniques are described in "Message Dispatch on Pipelined Processors," by K. Driesen et al., ECOOP, 1995, which is hereby incorporated by reference for all purposes.

Accordingly, there is a need for site specific message dispatch that is both efficient in terms of speed and computer code size. Additionally, there is a need for site specific message dispatch that is flexible and can adapt as the object-oriented program executes.

SUMMARY OF THE INVENTION

Embodiments of the present invention provide innovative site specific message dispatch techniques that may be efficient in terms of speed and computer code size. By providing sites specific message dispatch techniques, message dispatch may be optimized for each message dispatch site. Therefore, instead of attempting to find one message dispatch technique that is efficient for all call sites, the technique may be adjusted to better accommodate the specific site. Several embodiments of the invention are described below.

In one embodiment, the invention provides a method of implementing message dispatch in an object-oriented environment. A predicted receiver type is saved at a site wherein a message is dispatched to a receiver object. The message is then sent to the receiver object. Upon the receiver object receiving the message, it is verified that the receiver object is of the saved predicted receiver type. Typically, the predicted receiver type is saved into a register by a move instruction preceding the message dispatch instruction.

In another embodiment, the invention provides a method of implementing message dispatch in an object-oriented environment. A predicted receiver type is saved at a site where a message is dispatched to a receiver object. The message is then sent to the receiver object. Upon the receiver object receiving the message, it is verified that the receiver object is of the saved predicted receiver type. If the receiver object is not of the saved predicted receiver type, the predicted receiver type is changed to a type of the receiver object, a method lookup routine is called to obtain a new method, and the site is changed to invoke the new method.

In another embodiment, the invention provides a method of implementing message dispatch for an object-oriented program. A first message dispatch technique is performed at a specific site to dispatch messages to receiver objects. Dynamically during program execution, it is determined if a second message dispatch technique is desirable at the specific site. If the second message dispatch technique is desirable, the second message dispatch technique is performed at the specific site to dispatch messages to the receiver objects. In preferred embodiments, it is determined that the second message dispatch technique is desirable if the specific site has dispatched messages to more than a predetermined number of different receiver object types.

Other features and advantages of the invention will become readily apparent upon review of the following detailed description in association with the accompanying drawings.

DETAILED DESCRIPTION OF PREFERRED EMBODIMENTS

Definitions

Function—A software routine (also called a subroutine, procedure, member function, and method).

Message dispatch—A process of determining the method to handle a message that has been sent to the object into an object-oriented environment.

Receiver object (or receiver)—The object that has been sent a message in an object-oriented environment.

Receiver type—The class to which a receiver object belongs.

Call site (or site)—The location or area in a program where a message is dispatched to an object.

Overview

In the description that follows, the present invention will be described in reference to preferred embodiments that are designed for a Java™ virtual machine. In particular, examples will be described that are directed to IBM personal computers. However, the invention is not limited to any particular language, computer architecture, or specific implementation. Therefore, the description of the embodiments that follows is for purposes of illustration and not limitation.

Figure 1:
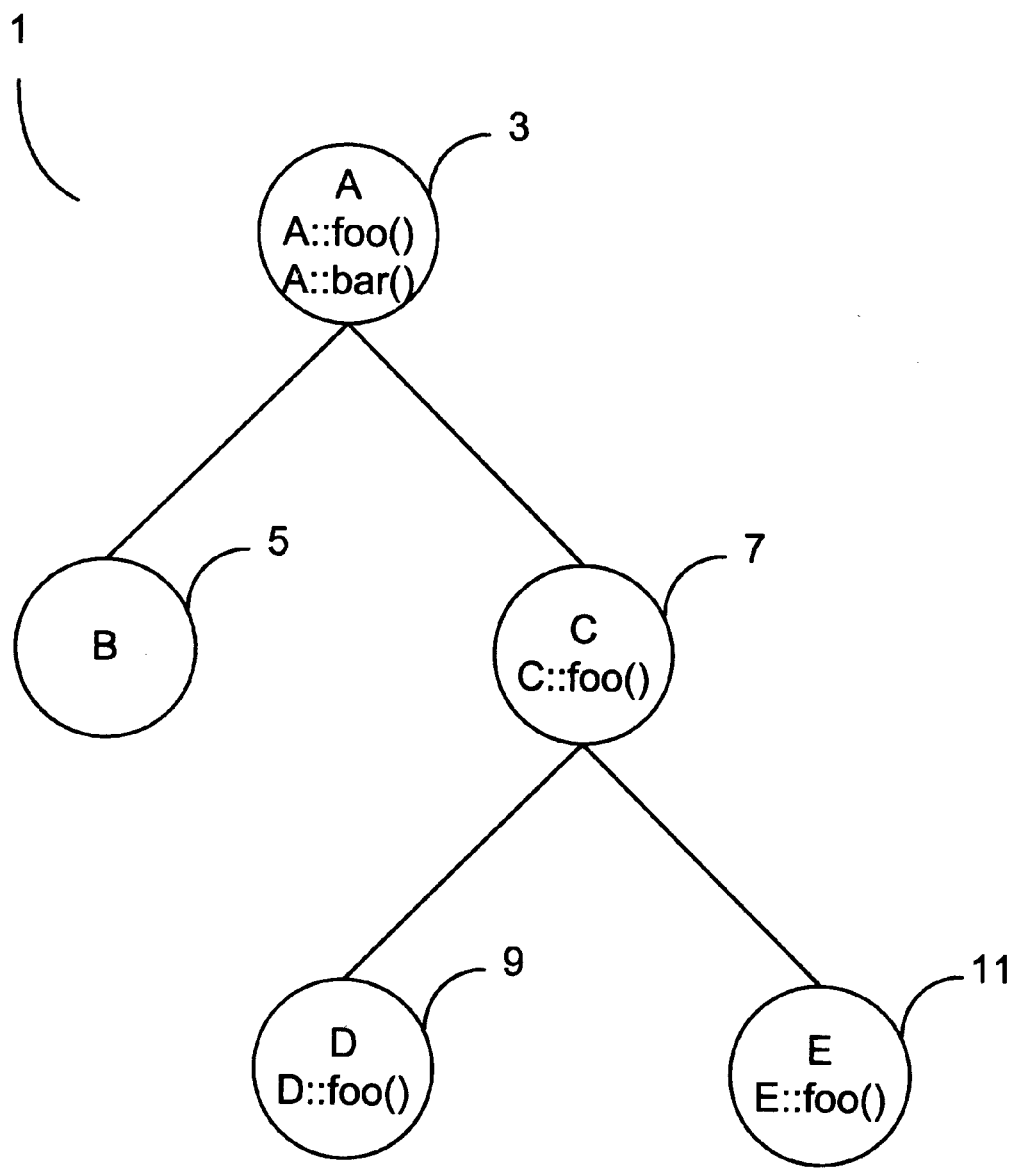
FIG. 1 illustrates a class hierarchy of classes including virtual functions in an object-oriented environment.
Figure 2:
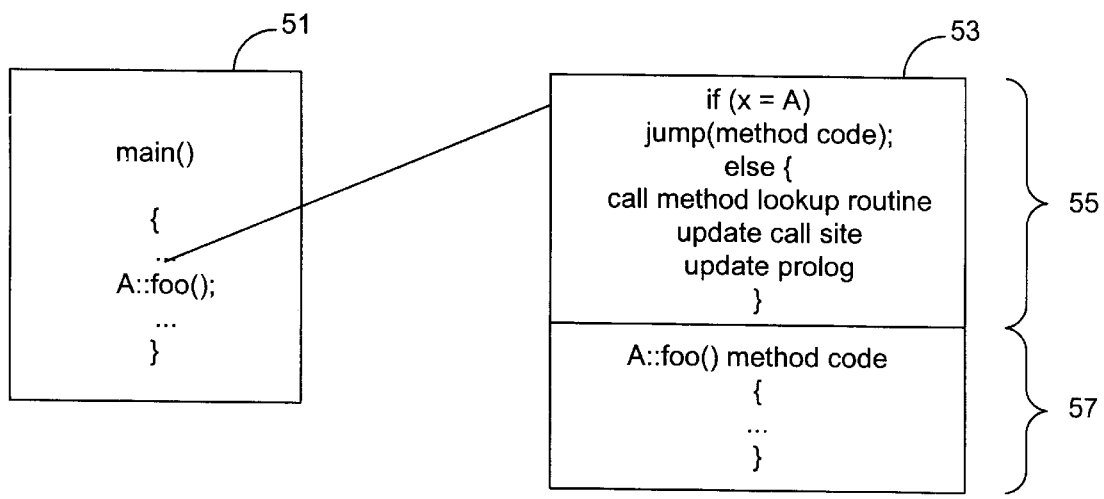
FIG. 2 illustrates an inline cache technique for object-oriented message dispatch.
Figure 3:
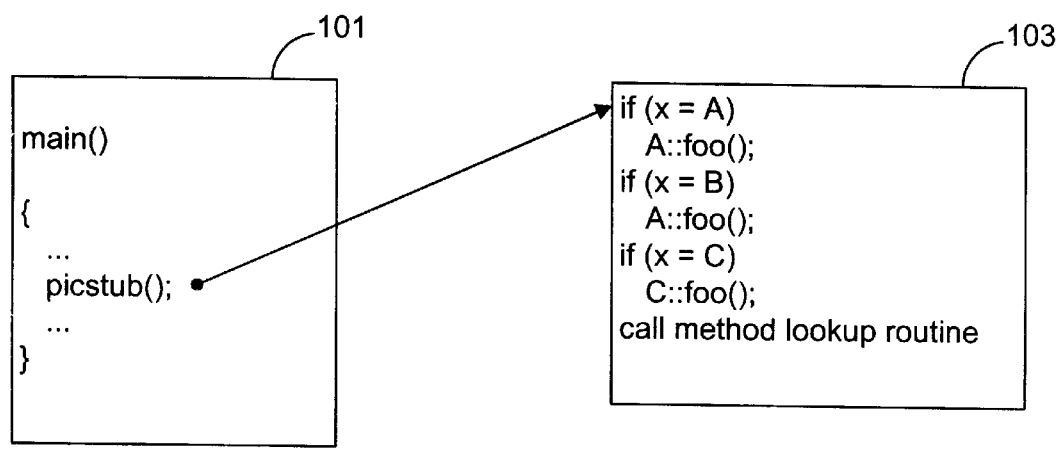
FIG. 3 illustrates an a polymorphic inline cache technique for object-oriented message dispatch.
Figure 4:
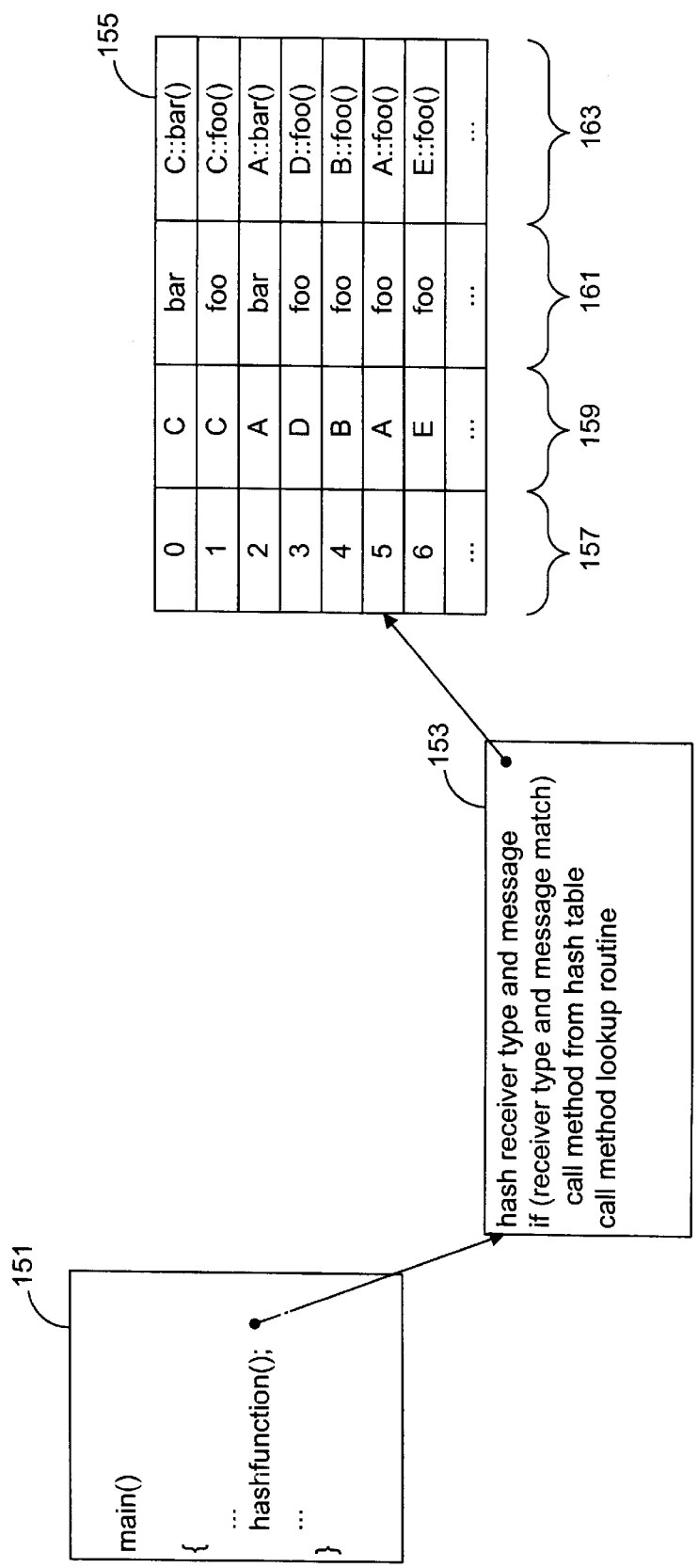
FIG. 4 illustrates a hashing technique for object-oriented message dispatch.
Figure 5:
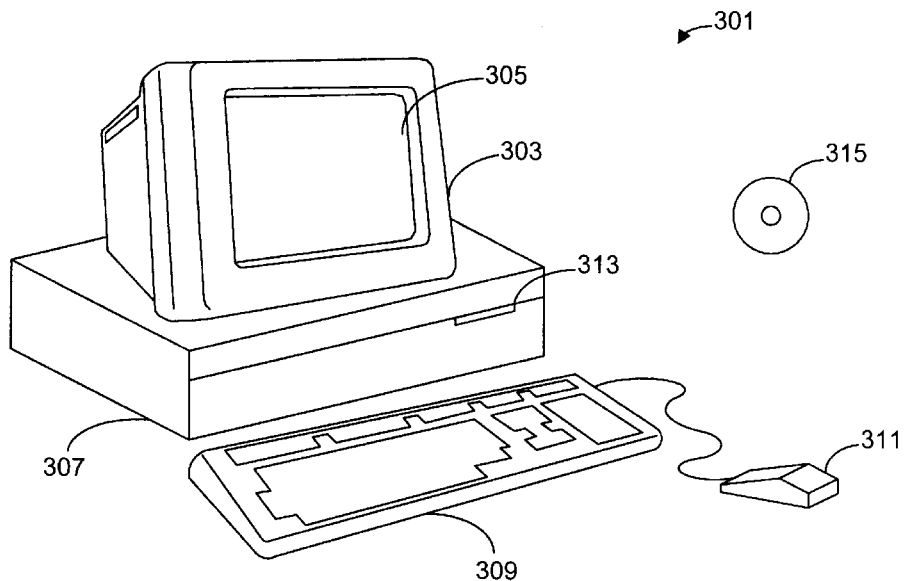
FIG. 5 illustrates an example of a computer system that may be utilized to execute the software of an embodiment of the invention.

FIG. 5 illustrates an example of a computer system that may be used to execute the software of an embodiment of the invention. FIG. 5 shows a computer system 301 that includes a display 303, screen 305, cabinet 307, keyboard 309, and mouse 311. Mouse 311 may have one or more buttons for interacting with a graphical user interface. Cabinet 307 houses a CD-ROM drive 313, system memory and a hard drive (see FIG. 6) which may be utilized to store and retrieve software programs incorporating computer code that implements the invention, data for use with the invention, and the like. Although CD-ROM 315 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium.

Figure 6:
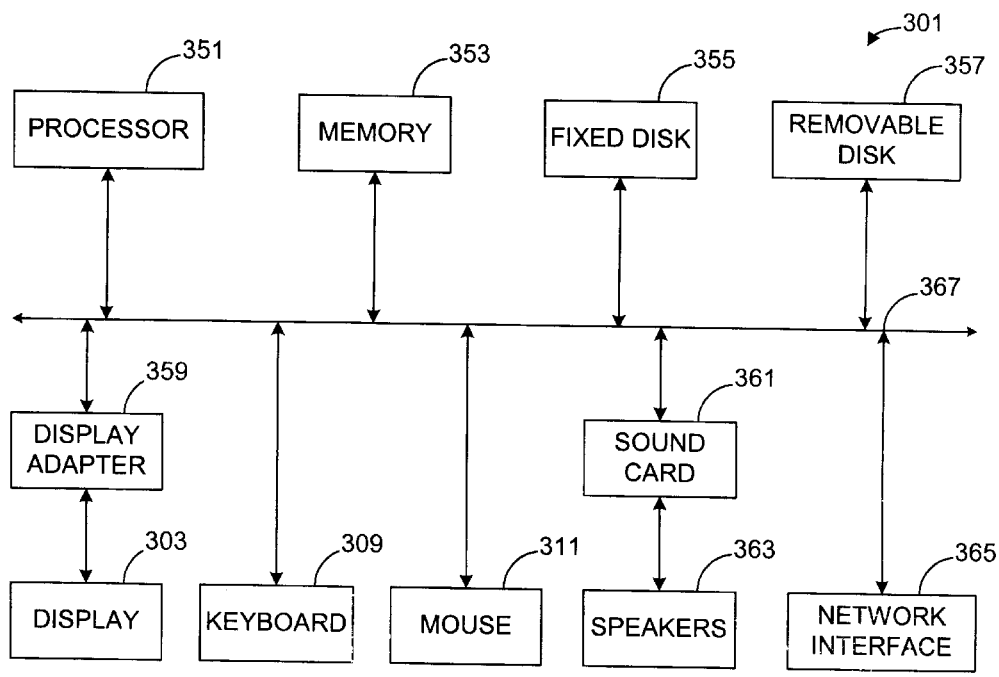
FIG. 6 illustrates a system block diagram of the computer system of FIG. 5.

FIG. 6 shows a system block diagram of computer system 301 used to execute the software of an embodiment of the invention. As in FIG. 5, computer system 301 includes monitor 303 and keyboard 309, and mouse 311. Computer system 301 further includes subsystems such as a central processor 351, system memory 353, fixed storage 355 (e.g., hard drive), removable storage 57 (e.g., CD-ROM drive), display adapter 359, sound card 361, speakers 363, and network interface 365. Other computer systems suitable for use with the invention may include additional or fewer subsystems. For example, another computer system could include more than one processor 351 (i.e., a multi-processor system) or a cache memory.

The system bus architecture of computer system 301 is represented by arrows 367. However, these arrows are illustrative of any interconnection scheme serving to link the subsystems. For example, a local bus could be utilized to connect the central processor to the system memory and display adapter. Computer system 301 shown in FIG. 6 is but an example of a computer system suitable for use with the invention. Other computer architectures having different configurations of subsystems may also be utilized.

Figure 7:
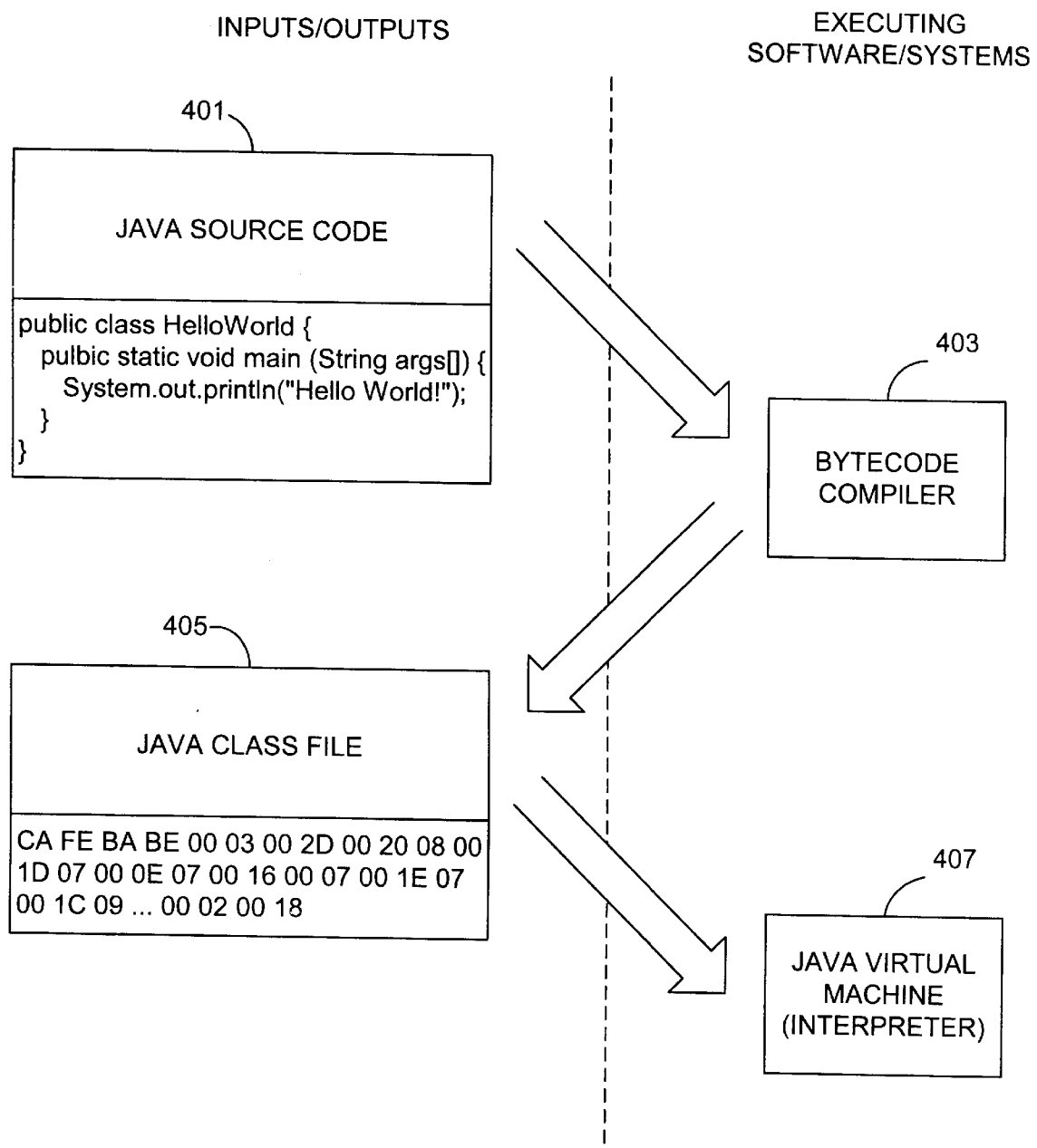
FIG. 7 illustrates how a Java source code program is executed.

The Java™ programming language was developed by Sun Microsystems. Typically, computer programs written in the Java programming language are compiled into bytecodes or Java virtual machine instructions that are then executed by a Java virtual machine. The bytecodes are stored in class files that are input into the Java virtual machine for interpretation. FIG. 7 shows a progression of a simple piece of Java source code through execution by an interpreter, the Java virtual machine.

Java source code 401 includes the classic Hello World program written in Java. The source code is then input into a bytecode compiler 403 that compiles the source code into bytecodes. The bytecodes are virtual machine instructions as they will be executed by a software emulated computer. Typically, virtual machine instructions are generic (i.e., not designed for any specific microprocessor or computer architecture) but this is not required. The bytecode compiler outputs a Java class file 405 that includes the bytecodes for the Java program.

The Java class file is input into a Java virtual machine 407. The Java virtual machine is an interpreter that decodes and executes the bytecodes in the Java class file. The Java virtual machine is an interpreter, but is commonly referred to as a virtual machine as it emulates a microprocessor or computer architecture in software (e.g., the microprocessor or computer architecture may not exist in hardware). In order to increase execution speed of the Java virtual machine, methods may be compiled into native machine instructions for faster execution. In the description of preferred embodiments that follows, compilation will be used to refer to the translation of Java virtual machine instructions into native machine instructions.

Site Specific Inline Cache

The invention provides a site specific inline cache technique for implementing message dispatch in object-oriented environments. Receiver type information is stored at the call site, which allows each call site to vary according to runtime characteristics of the call site. This allows message dispatch to not only be more efficient, but also to be more flexible.

Figure 8:
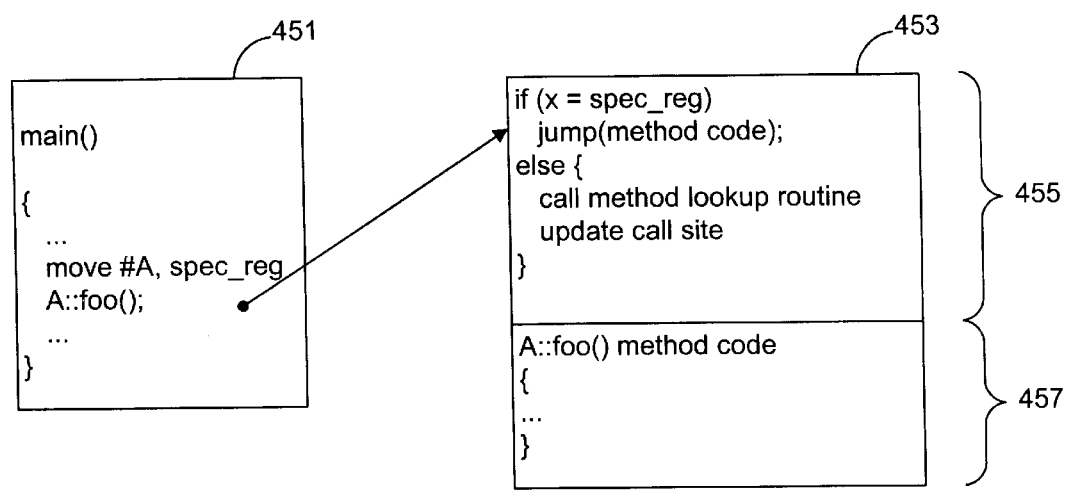
FIG. 8 illustrates an embodiment of a site specific inline cache technique for object-oriented message dispatch.

FIG. 8 illustrates a site specific inline cash technique according to one embodiment of the invention. As described in the above in the Background of the Invention, a method 51 originally included a message x.foo() for dispatch. The first time that this message is dispatched, the system may call a method lookup routine to determine the location of the appropriate method to handle the message. Alternatively, the system may perform a static analysis prior to runtime to determine what is likely to be the correct method.

With a site specific inline cache, once the class of the object that should handle the message is determined, an instruction is generated at the call site to save the receiver type or class. The message dispatch is then overwritten with a call to the specific method that should handle the message. Thus, a message dispatch becomes two instructions, one that saves a receiver type and a call to the appropriate method.

As shown, method 451 includes a move instruction that stores an id for the class A into a special register. The register is called a special register only for identification purposes. What is important is that if a register is utilized, the register should be otherwise unused at this call site. Although utilizing registers may provide the most efficient execution speed, other storage mechanisms may be utilized. For example, the receiver type may be stored in system memory or sent as a parameter to the message handling method.

Once the receiver type is saved, a call is made to a method 453 that handles the message, which is shown as A::foo(). A prolog 455 checks if the object x is of the saved receiver type, which is retrieved from the special register. In the example shown class A is the stored receiver type. Thus, if object x is of class A, a jump is made to a method code 457 of A::foo(). Otherwise, a method lookup routine is called to locate the appropriate method to handle the message. Then, the call site may be updated to save the receiver type of object x and a call to the method found by the method lookup routine.

The receiver type stored at the call site is therefore a predicted receiver type. It is the receiver type that the system predicts will be the receiver type of the next object to receive the message. If the predicted receiver type matches the receiver type of the object, the message dispatch is more efficient. Additionally, each message dispatch site may have receiver type information stored that is particular to that call site and another site will not overwrite the stored receiver type information.

Figure 9:
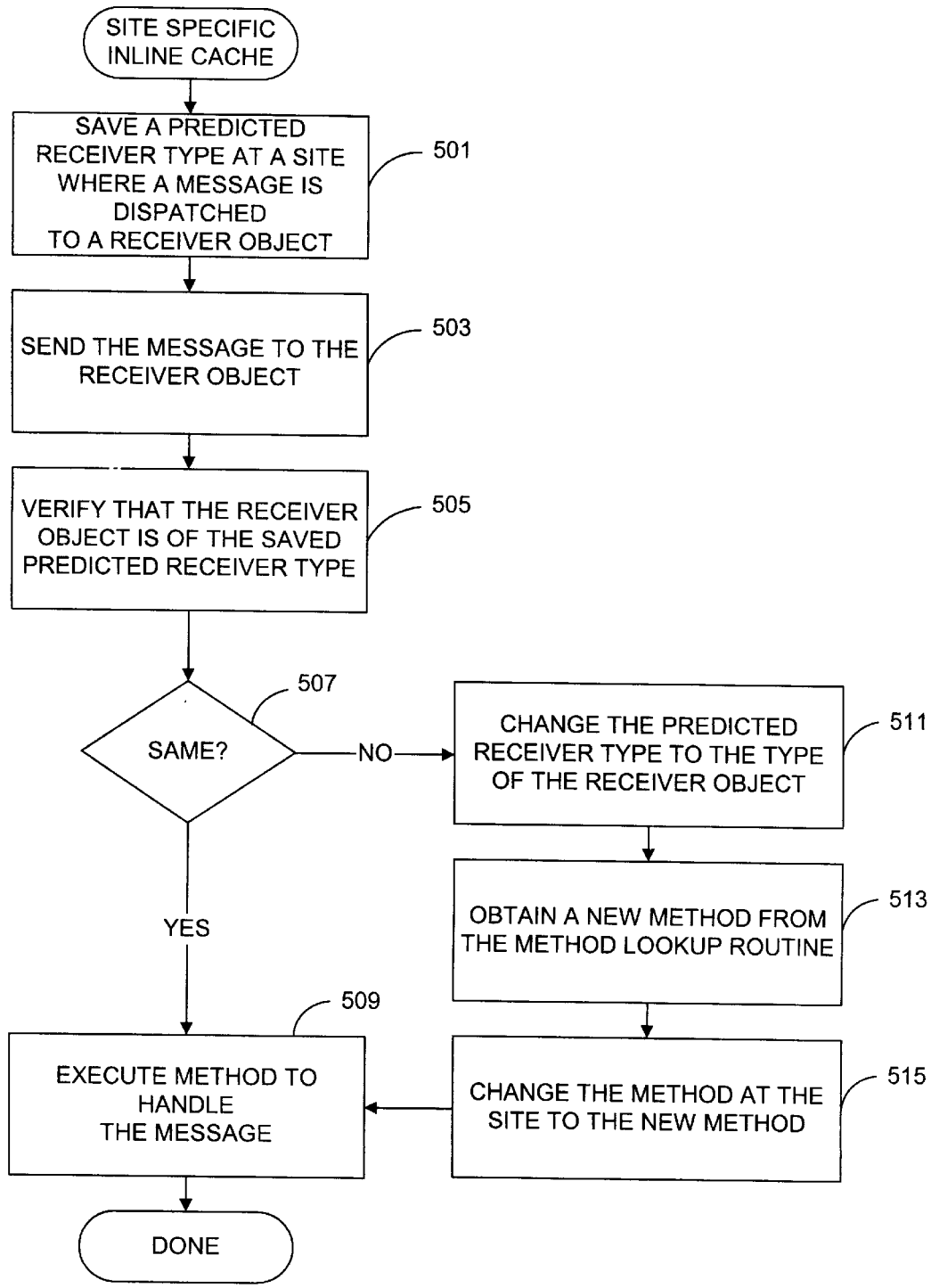
FIG. 9 shows a high level flowchart of an embodiment of a site specific inline cache technique for object-oriented message dispatch.

FIG. 9 shows a flowchart of an embodiment of the site specific inline cache technique for message dispatch. At a step 501, a predicted receiver type is saved at a site where a message is dispatched to a receiver object. In preferred embodiments, the receiver type is saved by utilizing a move instruction to place the receiver type in a register. However, other methods of saving the receiver type may be utilized that are well known to those of skill in the art, including the use of system memory or parameter passing.

At a step 503, the message is sent to the receiver object. The message is sent by a direct call to (or invocation of) the method that handles the message instead of utilizing a method lookup routine.

Once the receiver object receives the message, it is verified that the receiver object is of the saved predicted receiver type at a step 505. In preferred embodiments, this verification is performed in the prolog of the method (see FIG. 8). If the receiver object is of the same type as the saved predicted receiver type at a step 507, the method that handles the message is executed at a step 509. Step 509 may include performing a jump to the start of the method code that handles the message.

If the receiver object is not of the same type as the saved predicted receiver type, the predicted receiver type at the call site is changed to the receiver type of the receiver object at a step 511. The method lookup routine is called to obtain a new method at a step 513. The method lookup routine utilized may be any that are known to those of skill in the art, including dispatch table searches and virtual function tables. The method lookup routine provides the appropriate method to handle the message. The message dispatch at the call site is then changed to the method returned by the method lookup routine at a step 515.

As an example, assume that in FIG. 8, object x is of class A so the predicted receiver type stored at the call site in method 451 is class A. However, if object x is subsequently of class B, prolog 455 may modify the move instruction to store the class B in the special register as the predicted receiver type. Additionally, the message dispatch will be modified to invoke the method returned by the method lookup routine. Subsequent message dispatches at this call site that are directed at a receiver object of class B will then be more efficiently dispatched.

In FIG. 9, the method is shown as being executed after step 515 that changes the method at the site. The step of executing the method may actually occur within step 513 or at other locations. Therefore, in the flowcharts shown, steps may be reordered, added and deleted according to the specific implementation without departing from the spirit of the invention.

As described above, a site specific inline cache technique is provided that saves a predicted receiver type at a call site. By storing a predicted receiver type at a call site, message dispatch may be more efficient and flexible. For example, the operations at each call site may be insulated from each other so that one call site will not change the settings for another call site.

Site Specific Message Dispatch

The invention provides a site specific message dispatch technique that is flexible in allowing for different message dispatch techniques to be utilized at each site. Additionally, the message dispatch technique utilized at a call site may change over time, during runtime. Once it is determined that a new or different message dispatch technique is desirable at a specific site, the new message dispatch technique is set up for use at the specific call site. Thus, message dispatch becomes more flexible not only in terms of call site, but also in terms of the message dispatch technique that is utilized at call during different times during program execution.

Figure 10:
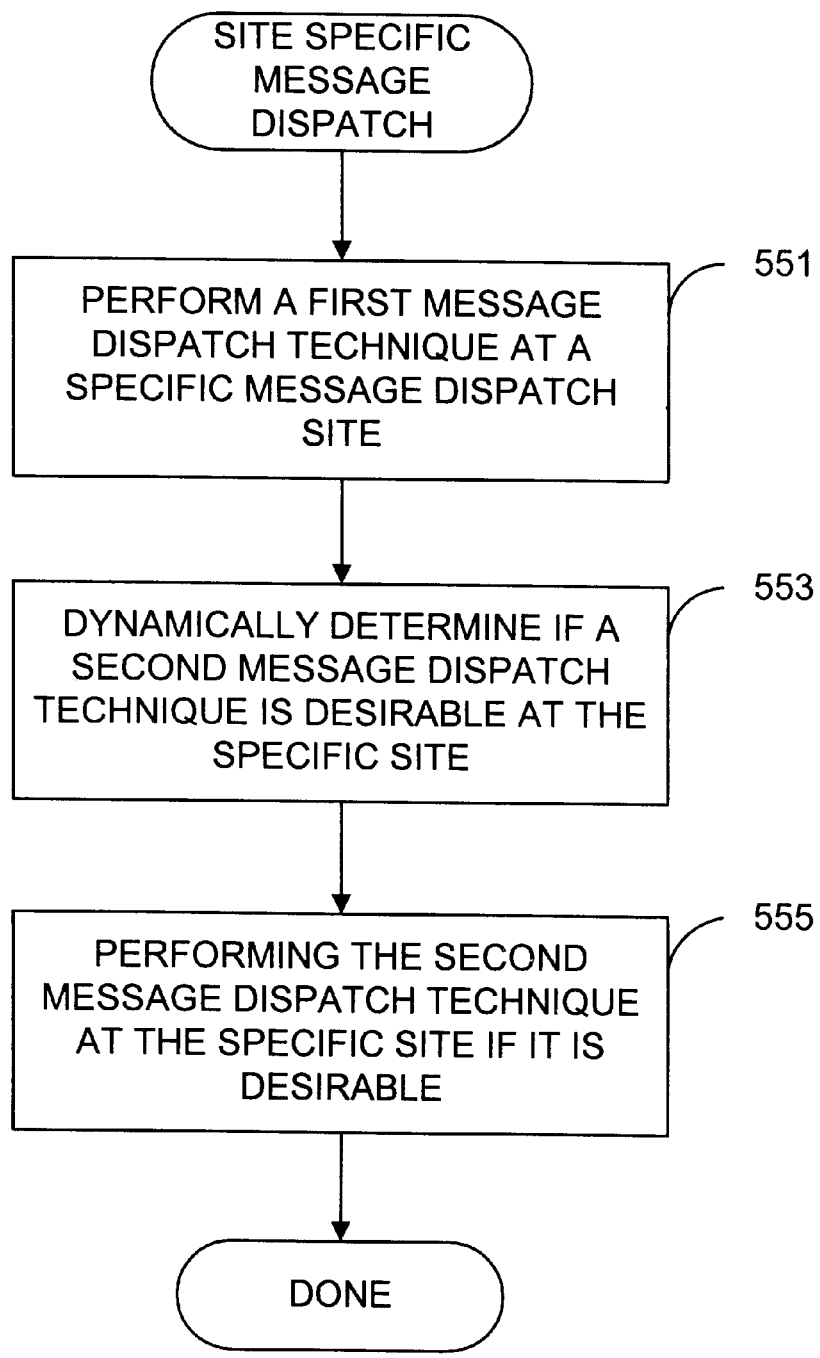
FIG. 10 shows a high level flowchart of an embodiment of a site specific message dispatch technique.

FIG. 10 shows a high level flowchart of an embodiment of site specific message dispatch. At a step 551, a first message dispatch technique is performed at a specific message dispatch site. The first message dispatch technique may be any number of message dispatch techniques known in the art. Preferably, the first message dispatch technique is a technique according to the present invention. For example, the first message technique may be an embodiment of the site specific inline cache described above. The first message dispatch technique may be determine statically before runtime or dynamically during runtime.

At a step 553, the system dynamically during runtime determines if a second message dispatch technique is desirable at the specific site. Any number of ways may be utilized to determine that a second message dispatch technique is desirable. For example, once the number of different receiver types encountered at this call site crosses a threshold, it may be desirable to switch to a different message dispatch technique. Additionally, a calculation may be performed on the frequency that the method lookup routine is called so that if the frequency is too high, a new message dispatch may technique be warranted.

At any rate, once it is determined that a second message dispatch technique is desirable, the second message dispatch technique is performed at the specific site at a step 555. The mechanism for switching to a new message dispatch technique typically depends on the new technique itself. Now that the high level flow has been described, it may be beneficial to discuss in more detail an embodiment of the step of dynamically determining if a second message dispatch technique is desirable.

Figure 11:
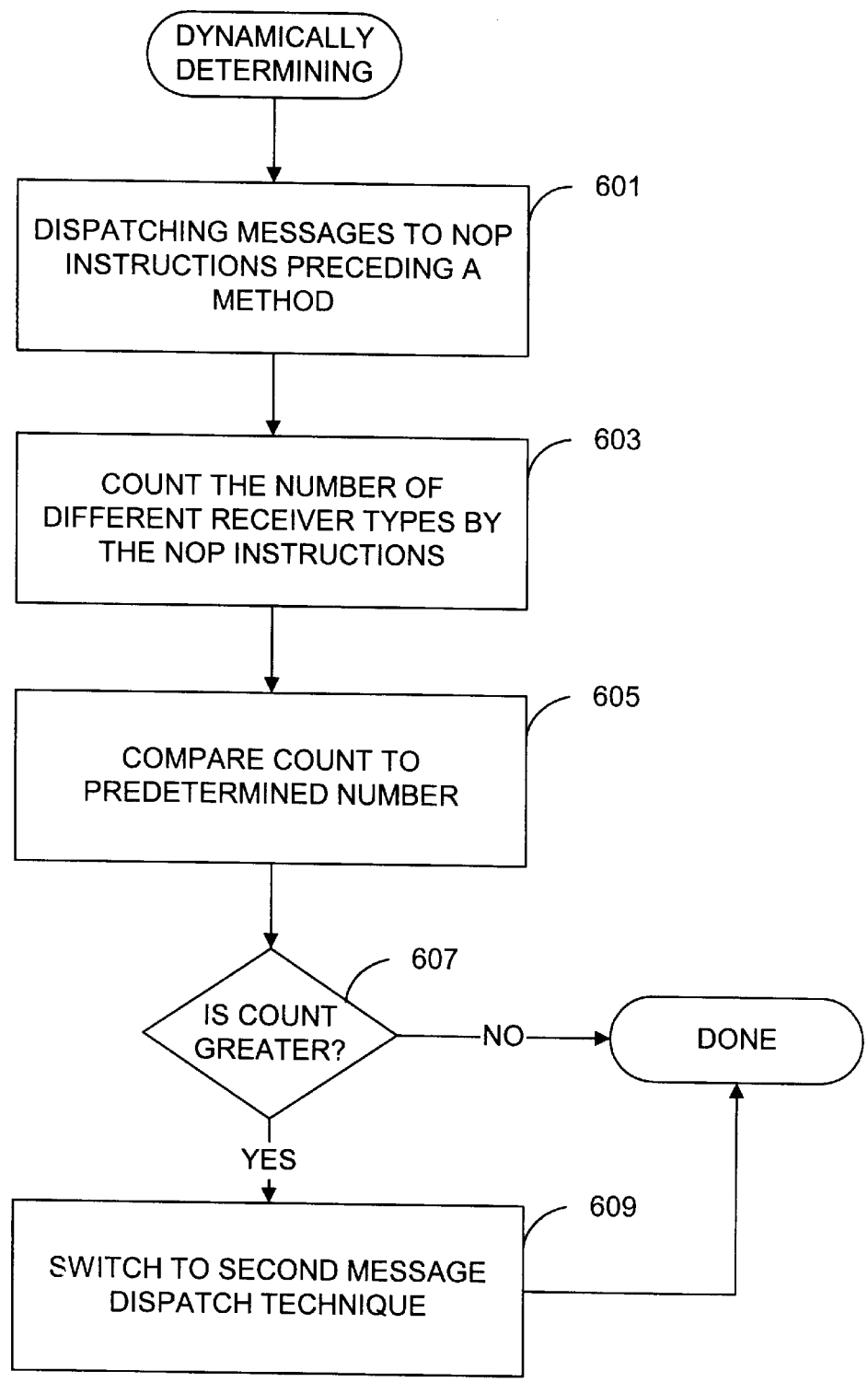
FIG. 11 shows a flowchart of dynamically determining if another message dispatch technique is desirable at a specific site.

FIG. 11 shows an embodiment of dynamically determining if a second message dispatch technique is desirable. The labels of first and second message dispatch techniques are presented as generic indications that one message dispatch technique may be switched to another at a specific call site. However, the invention is not limited to only two techniques, and may be advantageously applied to three or more techniques. Therefore, the labels of first and second are not an indication that the invention is limited to only two message dispatch techniques.

The embodiment shown in FIG. 11 relies on the number of different receiver types encountered at a specific call site as an indicator of when the message dispatch should be changed. As an example, a site specific inline cache technique may be utilized until five different receiver types have been encountered at this call site. When different receiver type is utilized in this context, it means that there have been five instances where the predicted receiver type has been different than the actual receiver type. This would mean that approximately five times, the method lookup routine has been called and the predicted receiver type that is stored at the call site has changed. As an example, a call site that alternates five times between receiver objects of classes A and B may be counted as five different receiver types.

Although a specific receiver type counter may be utilized at each call site, this may entail the use of memory and computer code to maintain the counter. In preferred embodiments, the counter is implemented as multiple no-operation (NOP) instructions preceding the method that handles the message. As will be described in more detail in reference to FIG. 12, the number of NOP instructions that implemented before the method indicates the number of different receiver types that have been encountered.

Referring to FIG. 11, the flowchart assumes that the method lookup routine has been called, otherwise, most likely, the current message dispatch technique is performing efficiently. At a step 601, the system dispatches messages to NOP instructions preceding the method that handles the message. The system counts the number of different receiver types by determining how many NOP instructions are executed before the method. Typically, this count will be determined by subtracting the address to where the message was dispatched for this site from the address of the actual method, including any prolog.

At a step 605, the count is compared to a predetermined number. The predetermined number is the number of different receiver types that may be encountered at a call site before it is desirable to switch to a different message dispatch technique. The predetermined number may be statically defined or calculated dynamically during runtime.

If the count is greater than the predetermined number at a step 607, a switch is made to the second message dispatch technique at a step 609. If the count is less than or equal to the predetermined number, this indicates that, at present, it is not desirable to switch to the second message dispatch technique. An example may help in illustrating how NOP instructions may be utilized as a counter.

Figure 12:
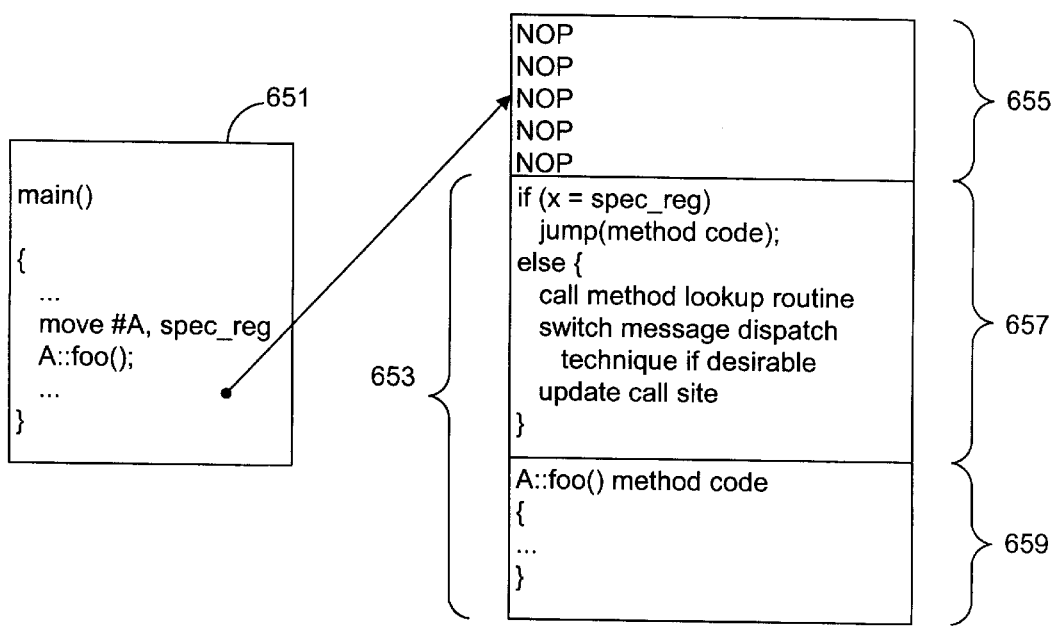
FIG. 12 illustrates an embodiment of a site specific message dispatch technique that utilizes NOP instructions to count the number of different receiver types that have been encountered.

FIG. 12 illustrates how NOP instructions may be utilized as a counter of the number of different receiver types that have been encountered at a specific call site. A method 651 is shown with a site specific inline cache as described previously. A method 653 handles the message, however, the method is preceded by a NOP section 655 that has multiple NOP instructions. NOP instructions may be chosen as they do nothing and may not unduly effect the operating speed of the method. Other instructions may be utilized instead of NOP instructions in other embodiments.

NOP section 655 precedes a prolog 657 and method code 659 of method 653. The NOP section is composed of a predetermined number of NOP instructions, typically the same number as the number of different receiver types that may be encountered at a call site before a switch to a different message dispatch technique is initiated. Each time the method lookup routine is called in prolog 657, the move instruction is patched with the receiver type of object x. Additionally, the subsequent message dispatch (e.g., A::foo()) is changed to one of the NOP instructions in NOP section 655 of the new method found by the method lookup routine.

As shown, the message dispatch points to the third NOP instruction before method 653. If prolog 657 determines that object x is not of class A, the prolog calculates the difference between the address specific at the call site and the beginning of method 653, which is obtainable during runtime by a number of known methods. The difference or count indicates the number of different receiver types that have been encountered at this specific call site. If the count is greater than a predetermined number, prolog 657 may switch the message dispatch technique utilized at this call site.

Utilizing NOP instructions before a method is easy to implement, fast, and does not require an excessive amount of computer code to keep the counter. Additionally, the NOP instructions in NOP section 655 may be referenced by multiple different call sites without any impact on each other.

The first message dispatch technique was shown as being a site specific inline cache. The second message dispatch technique may be a polymorphic inline cache or hashing technique, as each are designed to handle multiple receiver types. Of course, there is no limitation on the message dispatch techniques that may be utilized with the invention. The specific message dispatch techniques have been described herein to aid the reader's understanding.

As described above, a site specific message dispatch technique is provided that allows for a new message dispatch technique to be utilized at a specific call site when it is deemed desirable. By allowing each call site to switch message dispatch techniques when it becomes desirable, message dispatch may be more efficient and flexible. Additionally, the operations at each call site may be insulated from each other so that one call site will not change the settings for another call site.

Conclusion

While the above is a complete description of preferred embodiments of the invention, there is alternatives, modifications, and equivalents may be used. It should be evident that the invention is equally applicable by making appropriate modifications to the embodiments described above. For example, the site specific message dispatch techniques may be advantageously applied to object-oriented languages without departing from the spirit of the invention. Therefore, the above description should not be taken as limiting the scope of the invention that is defined by the meets and bounds of the impended claims along with their full scope of equivalents.

What is claimed is:

1. In a computer system, a method of implementing message dispatch for an object-oriented program, comprising:

performing a first dynamic message dispatch technique at a specific site to dispatch messages to receiver objects;

dynamically determining during program execution if a second message dispatch technique is desirable at the specific site based at least in part on a determination of a number of different receiver types that the specific site has dispatched messages to; and performing the second message dispatch technique at the specific site to dispatch messages to the receiver objects if the second message dispatch technique is desirable.

2. The method of claim 1, wherein the determining during program execution if a second message dispatch technique is desirable includes determining if the specific site has dispatched messages to more than a first predetermined number of different receiver types.

3. The method of claim 2, further comprising maintaining a count of different receiver types to which the first dispatch technique has dispatched messages.

4. The method of claim 3, where in the count is represented by dispatching messages to NOP instructions preceding a method that performs an operation specified by a dispatched message.

5. The method of claim 1, wherein the first message dispatch technique is determined statically before program execution.

6. The method of claim 1, wherein the first message dispatch technique is inline caching.

7. The method of claim 1, wherein the second message dispatch technique is selected from polymorphic inline caching and hashing.

8. The method of claim 1, further comprising:

dynamically determining during program execution if a third message dispatch technique is desirable at the specific site; and performing the third message dispatch technique at the specific site to dispatch messages to the receiver objects.

9. The method of claim 8, wherein the determining during program execution that a third message dispatch technique would be desirable includes determining if the specific site has dispatched messages to more than a second predetermined number of different receiver types if the third message dispatch technique is desirable.

10. The method of claim 1, wherein dynamically determining during program execution if a second message dispatch technique is desirable at the specific site includes dynamically determining during program execution if the second message dispatch technique is desirable at the specific site after performing the first message dispatch technique at the specific site.

11. A computer program product that implements message dispatch for an object-oriented program, comprising:

computer code that performs a first dynamic message dispatch technique at a specific site to dispatch messages to receiver objects;

computer code that dynamically determines during program execution if a second message dispatch technique is desirable at the specific site based at least in part on a determination of a number of different receiver types that the specific site has dispatched messages to; and computer code that performs the second message dispatch technique at the specific site to dispatch messages to the receiver objects if the second message dispatch technique is desirable; and a computer readable medium that stores the computer code.

12. The computer program product of claim 11, wherein the computer readable medium is selected from the group consisting of CD-ROM, floppy disk, tape, flash memory, system memory, hard drive, and data signal embodied in a carrier wave.

13. A computer system that implements message dispatch for an object-oriented program, comprising:

a processor that executes computer code;

computer code that performs a first dynamic message dispatch technique at a specific site to dispatch messages to receiver objects;

computer code that dynamically determines during program execution if a second message dispatch technique is desirable at the specific site based at least in part on a determination of a number of different receiver types that the specific site has dispatched messages to; and computer code that subsequently performs the second message dispatch technique at the specific site to dispatch messages to the receiver objects if the second message dispatch technique is desirable; and a computer readable medium that stores the computer code for the processor to execute.

14. In a computer system, a method of implementing message dispatch for an object-oriented program, comprising:

performing an inline caching based message dispatch technique at a specific site to dispatch messages to receiver objects;

dynamically determining during program execution if a second message dispatch technique is desirable at the specific site based at least in part on a determination of a number of different receiver types that the specific site has dispatched messages to; and performing the second message dispatch technique at the specific site to dispatch messages to the receiver objects if the second message dispatch technique is desirable.

15. The method of claim 14, wherein the second message dispatch technique is selected from polymorphic inline caching and hashing.

16. The method of claim 15, wherein the determining during program execution if a second message dispatch technique is desirable includes determining if the specific site has dispatched messages to more than a first predetermined number of different receiver types.

17. The method of claim 16, further comprising maintaining a count of different receiver types to which the first dispatch technique has dispatched messages.

18. The method of claim 17, wherein the count is represented by dispatching messages to NOP instructions preceding a method that performs an operation specified by a dispatched message.

19. The method of claim 16, further comprising:

dynamically determining during program execution if a third message dispatch technique is desirable at the specific site; and performing the third message dispatch technique at the specific site to dispatch messages to the receiver objects.

20. The method of claim 16, wherein the determining during program execution that a third message dispatch technique would be desirable includes determining if the specific site has dispatched messages to more than a second predetermined number of different receiver types if the third message dispatch technique is desirable.

21. The method of claim 15, further comprising:

dynamically determining during program execution if a third message dispatch technique is desirable at the specific site; and performing the third message dispatch technique at the specific site to dispatch messages to the receiver objects.

* * * * *